(12) United States Patent
Agata et al.

(10) Patent No.: US 10,310,203 B2
(45) Date of Patent: Jun. 4, 2019

(54) GROUNDING STRUCTURE OF OPTICAL FIBER CABLE

(71) Applicant: FUJIKURA LTD., Tokyo (JP)

(72) Inventors: Katsushi Agata, Sakura (JP); Norihiro Momotsu, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/850,785

(22) Filed: Dec. 21, 2017

(65) Prior Publication Data

US 2018/0196212 A1 Jul. 12, 2018

(30) Foreign Application Priority Data

Jan. 10, 2017 (JP) ................... 2017-001735

(51) Int. Cl.
*G02B 6/44* (2006.01)

(52) U.S. Cl.
CPC ........... *G02B 6/443* (2013.01); *G02B 6/4434* (2013.01); *G02B 6/441* (2013.01); *G02B 6/4403* (2013.01); *G02B 6/4416* (2013.01); *G02B 6/4433* (2013.01)

(58) Field of Classification Search
CPC ..... G02B 6/4429; G02B 6/443; G02B 6/4434
USPC ........................................ 385/101, 107, 113
See application file for complete search history.

(56) References Cited

U.S. PATENT DOCUMENTS

| | | | | |
|---|---|---|---|---|
| 5,491,766 A | * | 2/1996 | Huynh | ...................... G02B 6/00 385/100 |
| 5,598,500 A | | 1/1997 | Crespel et al. | |
| 5,636,306 A | * | 6/1997 | Mock | ................... G02B 6/4416 385/100 |
| 6,011,218 A | * | 1/2000 | Burek | .................. G02B 6/4419 174/135 |
| 7,284,994 B2 | * | 10/2007 | Kowalczyk | .......... G02B 6/4471 439/95 |
| D694,714 S | * | 12/2013 | Bastida | ........................ D13/149 |
| 9,147,967 B2 | * | 9/2015 | Johnson | ................... H01R 4/36 |

(Continued)

FOREIGN PATENT DOCUMENTS

| | | |
|---|---|---|
| JP | 2004-341181 A | 12/2004 |
| JP | 2012-168380 A | 9/2012 |

OTHER PUBLICATIONS

Office Action issued in corresponding Canadian Application No. 2,989,877 dated Oct. 5, 2018 (4 pages).

(Continued)

*Primary Examiner* — Robert Tavlykaev
(74) *Attorney, Agent, or Firm* — Osha Liang LLP

(57) ABSTRACT

A grounding structure of an optical fiber cable that includes a sheath, a plurality of optical fibers housed in the sheath, and a first tension member and a second tension member embedded in the sheath so as to interpose the optical fibers therebetween in a radial direction includes: a conductive member that electrically connects a first extending portion of the first tension member and a second extending portion of the second tension member. The first extending portion and the second extending portion extends from an end portion of the sheath. A length of the second extending portion in a longitudinal direction of the optical fiber cable is greater than a length of the first extending portion in the longitudinal direction. The second extending portion is held by a tension member holding portion and is electrically connected to a grounding circuit.

9 Claims, 5 Drawing Sheets

(56) References Cited

U.S. PATENT DOCUMENTS

| | | | | |
|---|---|---|---|---|
| 9,257,795 B2* | 2/2016 | Smith | ................ | H01R 13/655 |
| 2010/0158457 A1* | 6/2010 | Drozd | ................ | G02B 6/4432 |
| | | | | 385/113 |
| 2013/0121654 A1* | 5/2013 | Lichtenwalner | ..... | G02B 6/4429 |
| | | | | 385/100 |
| 2013/0177283 A1* | 7/2013 | Theuerkorn | ......... | G02B 6/4429 |
| | | | | 385/113 |
| 2018/0261986 A1* | 9/2018 | Kempeneers | .......... | H02G 3/083 |
| 2018/0287703 A1* | 10/2018 | Hicks, Jr. | ......... | H04B 10/25753 |

OTHER PUBLICATIONS

Office Action issued in corresponding Japanese Application No. 2017-001735 dated Aug. 7, 2018 (3 pages).

Office Action issued in corresponding Japanese Application No. 2017-001735 dated Jun. 19, 2018 (3 pages).

* cited by examiner

GROUNDING STRUCTURE OF OPTICAL FIBER CABLE

CROSS-REFERENCE TO RELATED APPLICATION

Priority is claimed on Japanese Patent Application No. 2017-001735, filed on Jan. 10, 2017, the content of which is incorporated herein by reference.

BACKGROUND

Field of the Invention

The present invention relates to a grounding structure of an optical fiber cable.

Description of Related Art

Japanese Unexamined Patent Application, First Publication No. 2004-341181 discloses a grounding structure for grounding a tension member of a so-called slot type optical fiber cable in which optical fibers are housed in groove portions of a slot rod and the tension member is disposed at the center of the slot rod. In the grounding structure, one tension member extends from the slot rod exposed from an end portion of the sheath, and the extended portion of the tension member is held by a tension member holding portion. The tension member holding portion is electrically connected to, for example, an external grounding circuit, so that the tension member is grounded.

Meanwhile, in recent years, a so-called center tube type optical fiber cable is also frequently used in which a plurality of optical fibers are arranged in a radially center portion of an optical fiber cable and tension members are disposed such that the plurality of optical fibers are interposed therebetween in the radial direction.

Here, in the case of grounding the tension members of the center tube type optical fiber cable using a grounding structure such as that disclosed in Japanese Unexamined Patent Application, First Publication No. 2004-341181, for example, the two tension members are held together by a tension member holding portion, or a new tension member holding portion is added. In the case of holding the two tension members together, the grounding work may take time, and also the holding state of the tension member tends to become unstable. In the case of adding a new tension member holding portion, the installation work may take time, and also the size of the device may increase.

SUMMARY

One or more embodiments of the present invention easily and reliably ground a plurality of tension members provided in an optical fiber cable.

One or more embodiments of the present invention are directed to a grounding structure of an optical fiber cable. The optical fiber cable includes: a sheath, a plurality of optical fibers housed in the sheath, and a first tension member and a second tension member embedded in the sheath so as to interpose the optical fibers therebetween in a radial direction. The grounding structure of the optical fiber includes: a conductive member which electrically connects a first extending portion of the first tension member and a second extending portion of the second tension member, the first extending portion and the second extending portion extending from an end portion of the sheath. A length of the second extending portion in a longitudinal direction of the optical fiber cable is greater than a length of the first extending portion in the longitudinal direction. The second extending portion is held by a tension member holding portion and is electrically connected to a grounding circuit.

The conductive member may include a first attachment portion attached to the first extending portion, a second attachment portion attached to the second extending portion, and a connection portion that connects the first attachment portion and the second attachment portion to each other.

The conductive member may be integrally formed of a plate-shaped metal material.

The second tension member may be electrically connected to the grounding circuit through the tension member holding portion.

The tension member holding portion may be provided in an optical connection device.

According to one or more embodiments, it is possible to easily and reliably ground a plurality of tension members provided in the optical fiber cable.

DETAILED DESCRIPTION

Hereinafter, the configuration of a closure 100 using a grounding structure of an optical fiber cable according to one or more embodiments will be described with reference to FIGS. 1 to 6. In each diagram used in the following description, the scale of each member is appropriately changed in order to make each member have a recognizable size.

Figure 1:
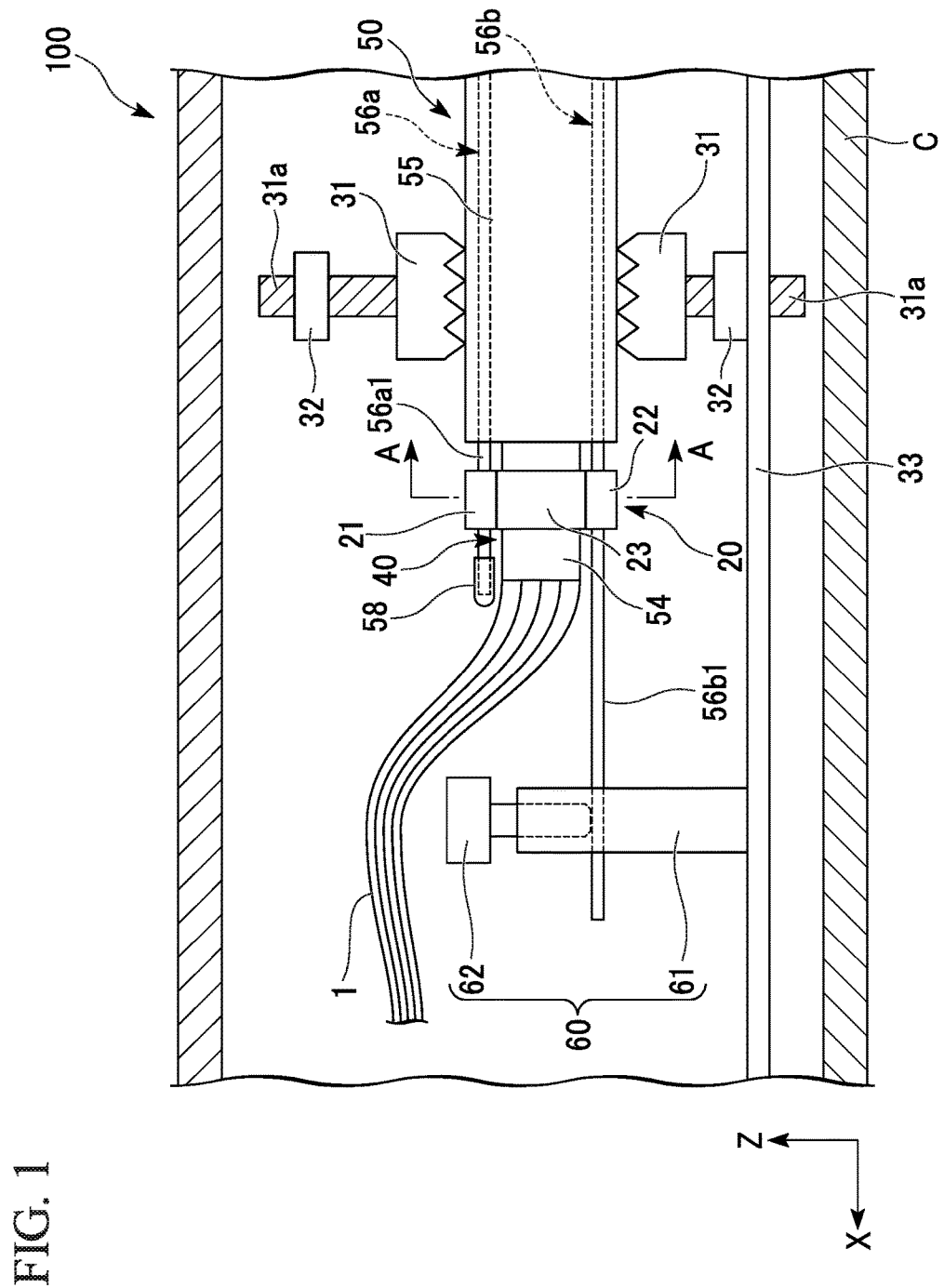
FIG. 1 is a conceptual diagram of a closure using a grounding structure of an optical fiber cable according to one or more embodiments.

As shown in FIG. 1, in the closure 100, an end portion of an optical fiber cable 50 is housed in a case body C to protect a branch portion, a connection portion, or the like of optical fibers 1.

Here, in one or more embodiments, the relationship between positions of each component will be described by setting the XYZ orthogonal coordinate system. The X direction is a direction in which the optical fiber cable 50 extends (hereinafter, referred to as a longitudinal direction). The Z direction is referred to as an up-down direction, and the Y direction is referred to as a crosswise direction.

Figure 6:
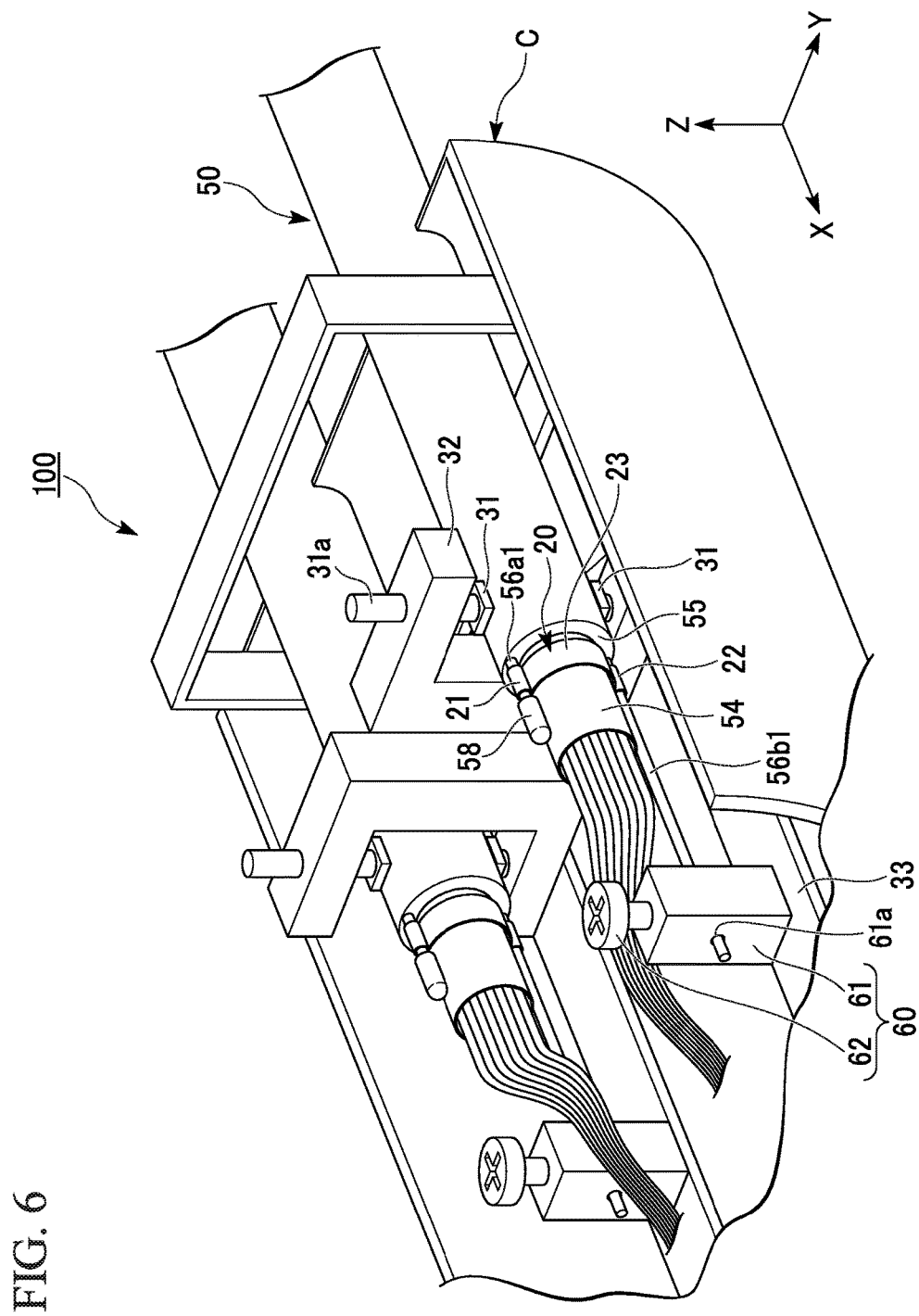
FIG. 6 is a perspective view of the closure shown in FIG. 1.

As shown in FIG. 6, the closure 100 houses end portions of two optical fiber cables 50 arranged to be next to each other in the crosswise direction.

Figure 2:
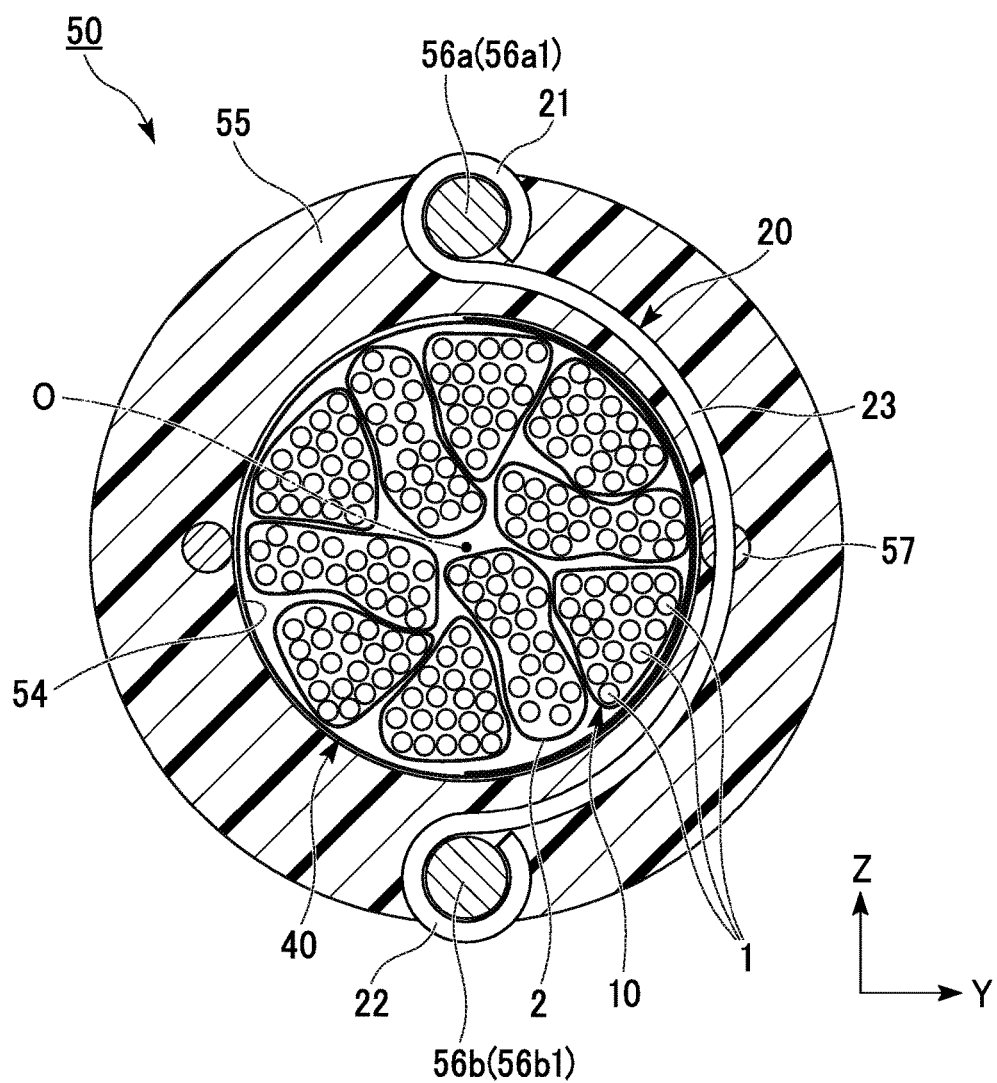
FIG. 2 is a cross-sectional view of the optical fiber cable shown in FIG. 1 taken along the line A-A.

As shown in FIGS. 1 and 2, the optical fiber cable 50 includes a core 40, a sheath 55, a tension member 56a (first tension member), a tension member 56b (second tension member), and a pair of rip cords 57.

The sheath 55 houses the core 40 including a plurality of optical fiber units 10. The first tension member 56a, the second tension member 56b, and the pair of rip cords 57 are embedded in the sheath 55.

The sheath 55 is formed in a cylindrical shape. As the material of the sheath 55, polyolefin (PO) resins, such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), and the like can be used.

The core 40 includes a plurality of optical fiber units 10, each of which has a plurality of optical fibers or coated optical fibers (hereinafter, simply referred to as optical fibers 1), wrapped with a winding tape (wrapping tube) 54. The optical fiber units 10 are formed by binding a plurality of optical fibers 1 with binding materials 2.

Figure 3:
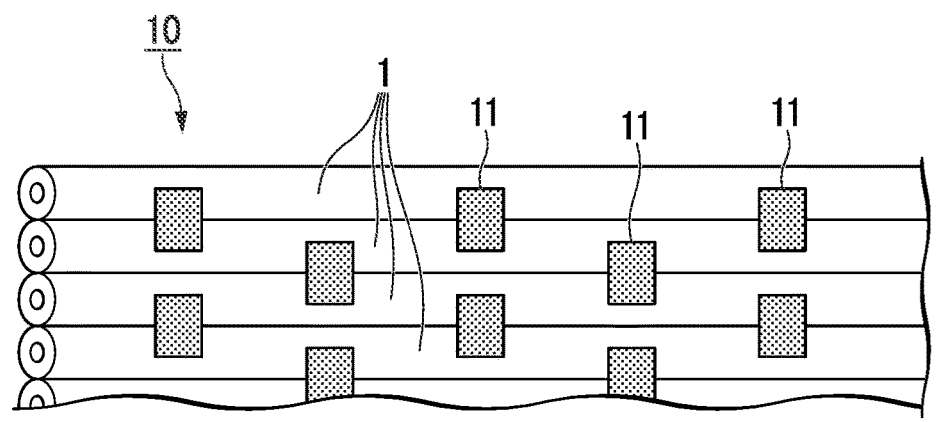
FIG. 3 is a developed view of an optical fiber unit shown in FIG. 2.

As shown in FIG. 3, the optical fiber unit 10 of one or more embodiments is a so-called intermittent fixed tape ribbon, and includes a plurality of connection portion 11 connecting the adjacent coated optical fibers 1 to each other and placed at intervals in the longitudinal direction. More specifically, a plurality of optical fibers 1 are arranged side by side, and the adjacent optical fibers 1 are connected to each other by the connection portions 11. The connection portions 11 are disposed at fixed intervals in the longitudinal direction. A connection portion 11 that connects adjacent optical fibers 1 and another connection portion 11 that connects one of the adjacent optical fiber 1 and another optical fiber 1 are disposed at a position shifted in the longitudinal direction. Thus, the connection portions 11 are arranged in a zigzag manner with respect to both directions of the longitudinal direction of the optical fiber unit 10 and the width direction perpendicular to the longitudinal direction. The connection portion 11 is formed of, for example, a UV-curable resin, and is bonded to adjacent optical fibers 1. The optical fibers 1 connected to each other by the connection portion 11 may be pulled by fingers so as to be separated from each other in the width direction of the optical fiber unit 10, so that the connection state can be released by peeling off the connection portion 11 from the optical fiber 1 by hand.

Without being limited to the intermittent fixed tape ribbon, for example, one obtained by simply binding a plurality of optical fibers 1 with the binding material 2 may be used as the optical fiber unit 10.

As the material of the rip cord 57, it is possible to use a cylindrical rod formed of PP or nylon. Alternatively, the rip cord 57 may be formed by a yarn obtained by twisting fibers, such as PP or polyester, so that the rip cord 57 has a water absorption property.

A pair of rip cords 57 are embedded in the sheath 55 and arranged with the core 40 interposed therebetween in the radial direction. The number of rip cords 57 embedded in the sheath 55 may be one or three or more.

As the material of the tension members 56a and 56b, for example, a metal wire (steel wire) can be used.

The pair of tension members 56a and 56b are embedded in the sheath 55 with the core 40 interposed therebetween in the radial direction. In addition, the pair of tension members 56a and 56b are disposed at equal intervals in the radial direction from the core 40. The tension member 56a is disposed above the core 40, and the tension member 56b is disposed below the core 40. In the up-down direction, the tension member 56b is disposed at a position closer to a base member 33, which will be described later, than the core 40.

As shown in FIGS. 1 and 6, the closure 100 includes the case body C, the base member 33, a cable fixing portion 32 fixed to the base member 33, a pair of rasp-cut clamp 31 held by the cable fixing portion 32, and a tension member holding portion 60. In FIG. 6, the upper case body C is omitted.

The base member 33 is a metal plate and has conductivity. The base member 33 is electrically connected to a grounding circuit (not shown). As the grounding circuit, for example, a ground wire provided on the electric pole can be used. The cable fixing portion 32 is a metal block formed in a C shape. The cable fixing portion 32 has a pair of screw holes. The rasp-cut clamp 31 has a screw portion 31a, and the screw portion 31a is inserted through the screw hole of the cable fixing portion 32. By interposing the optical fiber cable 50 between the pair of rasp-cut clamps 31, the optical fiber cable 50 is fixed to the cable fixing portion 32.

The core 40 and the pair of tension members 56a and 56b extend from the end portion of the sheath 55 of the optical fiber cable 50 fixed to the cable fixing portion 32. The portion of the first tension member 56a extending from the end portion of the sheath 55 refers to as a first extending portion 56a1, and the portion of the second tension member 56b extending from the end portion of the sheath 55 refers to as a second extending portion 56b1. The extension length of the tension member 56b in the longitudinal direction from the end portion of the sheath 55 is greater than the extension length of the tension member 56a in the longitudinal direction from the end portion of the sheath 55. The length of the second extending portion 56b1 in the longitudinal direction of the optical fiber cable 50 is greater than the length of the first extending portion 56a1 in the longitudinal direction. In the core 40, each of the plurality of optical fiber units 10 extends longer in the longitudinal direction from the end portion of the sheath 55 than the winding tape 54.

The tension member holding portion 60 is attached to the base member 33. The tension member holding portion 60 includes a holding block 61 and a screw 62. The holding block 61 is formed in a columnar shape, and is fixed to the base member 33. The holding block 61 is formed of a material having conductivity, such as metal. In the holding block 61, a through hole 61a penetrating through the holding block 61 in the longitudinal direction is formed. The inner diameter of the through hole 61a is larger than the outer diameter of the tension member 56b. A screw hole extending in the up-down direction is formed on the upper surface of the holding block 61. The screw hole reaches the through hole 61a. The screw 62 is screwed into the screw hole.

Here, the closure 100 of one or more embodiments includes a conductive member 20 for electrically connecting the tension members 56a and 56b to each other and a cap 58 covering the end portion of the first extending portion 56a1. The cap 58 covers the end portion of the first extending portion 56a1 to protect the end portion.

The conductive member 20 includes a first attachment portion 21 attached to the first extending portion 56a1, a second attachment portion 22 attached to the second extending portion 56b1, and a connection portion 23 that connects the first attachment portion 21 and the second attachment portion 22 to each other.

Figure 4:
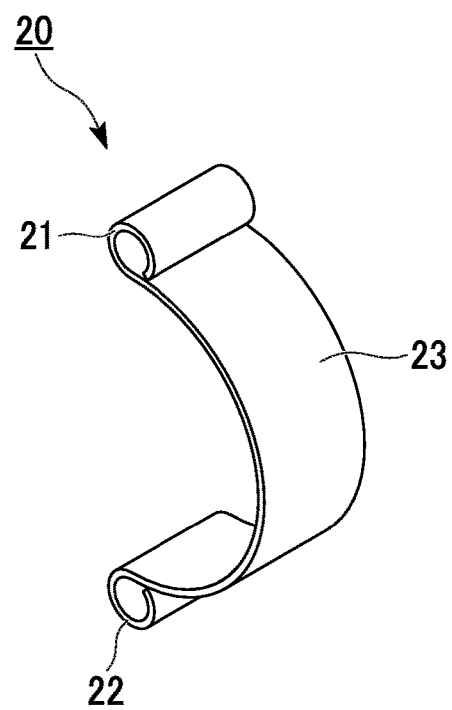
FIG. 4 is a perspective view of a conductive member shown in FIG. 1.

As shown in FIG. 4, the conductive member 20 is integrally formed of a plate-shaped metal material. Specifically, the first attachment portion 21 and the second attachment portion 22 are formed by curling both end portions of the rectangular metal material. Then, by curving a portion between both the end portions, the connection portion 23 is formed.

As shown in FIG. 6, the connection portion 23 is located radially outside of the core 40. The inner diameter of the connection portion 23 is larger than the outer diameter of the core 40.

The second extending portion 56b1 of the second tension member 56b is fastened by the screw 62 in a state in which the second extending portion 56b1 is inserted into the through hole 61a of the holding block 61. With this configuration, the tension member 56b is held by the tension member holding portion 60 and is electrically connected to the above-described grounding circuit through the tension member holding portion 60.

As described above, in the closure 100 of one or more embodiments, the tension member 56a is electrically connected to the tension member 56b by the conductive member 20. The tension member 56b is electrically connected to the base member 33 through the tension member holding portion 60. The base member 33 is connected to a grounding circuit (not shown). Therefore, both the tension members 56a and 56b are connected to the grounding circuit.

In order to ground the tension members 56a and 56b in a case where the end portion of the optical fiber cable 50 is housed in the closure 100, the tension members 56a and 56b are extended from the end portion of the sheath 55 so that the conductive member 20 is attached thereto. In this case, the tension members 56a and 56b are cut so that the length of the first extending portion 56a1 is shorter than the length of the second extending portion 56b1. Then, the tension member 56b which is disposed below the core 40 and whose extension length from the end portion of the sheath 55 is long may be held by the tension member holding portion 60.

In one or more embodiments, the extension length of the tension member 56a, which is located at a position (above the core 40) farther from the base member 33 than the core 40 in the up-down direction, from the end portion of the sheath 55 is smaller than the extension length of the tension member 56b. The tension member 56b located at a position (below the core 40) closer to the base member 33 than the core 40 in the up-down direction is held by the tension member holding portion 60. With the above configuration, since the space above the core 40 extending from the end portion of the sheath 55 is largely opened, the degree of freedom of the postures and mobility of the core 40 and the optical fibers 1 included in the core 40 in this space are increased. Furthermore, it is possible to use a known tension member holding portion that holds one tension member, such as that used in a known slot type optical fiber cable.

As described above, in the grounding structure of one or more embodiments, it is possible to ground the plurality of tension members 56a, 56b easily and reliably.

In addition, since the conductive member 20 is integrally formed of a plate-shaped metal material, the manufacturing cost of the conductive member 20 can be reduced. For example, in a case where the connection portion 23 is made to have a plate thickness such that the connection portion 23 can be deformed by the force of the fingers, the distance between the first attachment portion 21 and the second attachment portion 22 can be easily adjusted by deforming the connection portion 23. As a result, it is possible to easily respond to the optical fiber cable 50 having a different distance between the tension members 56a and 56b or a different outer diameter of the core 40 by deforming the connection portion 23. Therefore, according to one or more embodiments, since one type of conductive member 20 responds to various types of optical fiber cables 50, it is possible to improve versatility.

In addition, it should be understood that the technical scope of the invention is not limited to the above embodiments, and various modifications can be made without departing from the spirit and scope of the invention.

For example, although the closure 100 having the grounding structure of the optical fiber cable 50 has been described in the above embodiments, the grounding structure may be used for other optical connection devices, such as a wiring board. In this case, the tension member holding portion 60 may be provided in an optical connection device.

Figure 5:
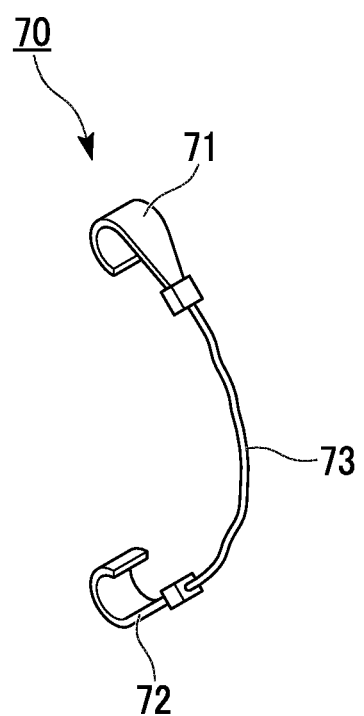
FIG. 5 is a perspective view of a conductive member in a modification example according to one or more embodiments.

In the embodiments described above, the conductive member 20 integrally formed of a plate-shaped metal material is used. However, the form of the conductive member 20 is not limited thereto, and a member that can electrically connect the tension members 56a and 56b to each other may be used. For example, as shown in FIG. 5, a conductive member 70 which is provided with a hook-shaped first attachment portion 71, a hook-shaped second attachment portion 72, and a bond wire 73 (connection portion) which electrically connects the first attachment portion 71 and the second attachment portion 72, may also be used. Alternatively, a conductive ring or the like may be engaged with the first and second extending portions 56a1 and 56b1, so that the ring is used as a conductive member.

In addition, although the optical fiber cable 50 in which the two tension members 56a and 56b are embedded in the sheath 55 has been described in the above embodiments, the invention is not limited thereto, and the grounding structure of the embodiments described above may be applied to an optical fiber cable including three or more tension members. In this case, one of the three or more tension members may be made to extend largely from the end portion of the sheath 55 compared with the other tension members. The other tension members may be electrically connected to the one tension member, which is largely extended, using a conductive member.

It is also possible to appropriately replace the components in the above embodiments with known components without departing from the scope of the invention, and the above embodiments or modifications may be appropriately combined.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A grounding structure of an optical fiber cable, wherein the optical fiber cable comprises: a sheath, a plurality of optical fibers housed in the sheath, and a first tension member and a second tension member embedded in the sheath so as to interpose the optical fibers therebetween in a radial direction, the grounding structure comprising:
 a conductive member that electrically connects a first extending portion of the first tension member and a second extending portion of the second tension member,
  wherein the conductive member comprises:
   a first attachment portion attached to the first extending portion;
   a second attachment portion attached to the second extending portion; and
   a connection portion that connects the first attachment portion and the second attachment portion, wherein the connection portion is deformable, and a distance between the first and the second attachment portions is adjustable by deforming the connection portion, wherein:

the first extending portion and the second extending portion extend from an end portion of the sheath, a length of the second extending portion in a longitudinal direction of the optical fiber cable is greater than a length of the first extending portion in the longitudinal direction, and the second extending portion is held by a tension member holding portion and is electrically connected to a grounding circuit.

2. The grounding structure of an optical fiber cable according to claim 1, wherein the conductive member is integrally formed of a plate-shaped metal material.

3. The grounding structure of an optical fiber cable according to claim 1, wherein the second tension member is electrically connected to the grounding circuit through the tension member holding portion.

4. The grounding structure of an optical fiber cable according to claim 1, wherein the tension member holding portion is provided in an optical connection device.

5. The grounding structure of an optical fiber cable according to claim 1, wherein the second tension member is located closer to a base member that is electrically connected to the grounding circuit than the optical fibers.

6. The grounding structure of an optical fiber cable according to claim 1, wherein the first attachment portion and the second attachment portion curl around the first extending portion and the second extending portion, respectively.

7. The grounding structure of an optical fiber cable according to claim 1, wherein the optical fibers are wrapped with a winding tape that extends from the end portion of the sheath.

8. The grounding structure of an optical fiber cable according to claim 1, wherein a cap covers an end portion of the first extending portion.

9. A grounding structure of an optical fiber cable, wherein the optical fiber cable comprises: a sheath, a plurality of optical fibers housed in the sheath, and a first tension member and a second tension member embedded in the sheath so as to interpose the optical fibers therebetween in a radial direction, the grounding structure comprising:

a conductive member that electrically connects a first extending portion of the first tension member and a second extending portion of the second tension member, wherein:

the first extending portion and the second extending portion extend from an end portion of the sheath, the conductive member comprises:

a first attachment portion attached to the first extending portion;

a second attachment portion attached to the second extending portion; and a connection portion that connects the first attachment portion and the second attachment portion, the first attachment portion and the second attachment portion wind around the first extending portion and the second extending portion, respectively, a length of the second extending portion in a longitudinal direction of the optical fiber cable is greater than a length of the first extending portion in the longitudinal direction, and the second extending portion is held by a tension member holding portion and is electrically connected to a grounding circuit.

* * * * *